Nov. 15, 1955
C. C. ALVORD
2,723,504
GRINDING MACHINE
Filed Aug. 18, 1954
2 Sheets-Sheet 1
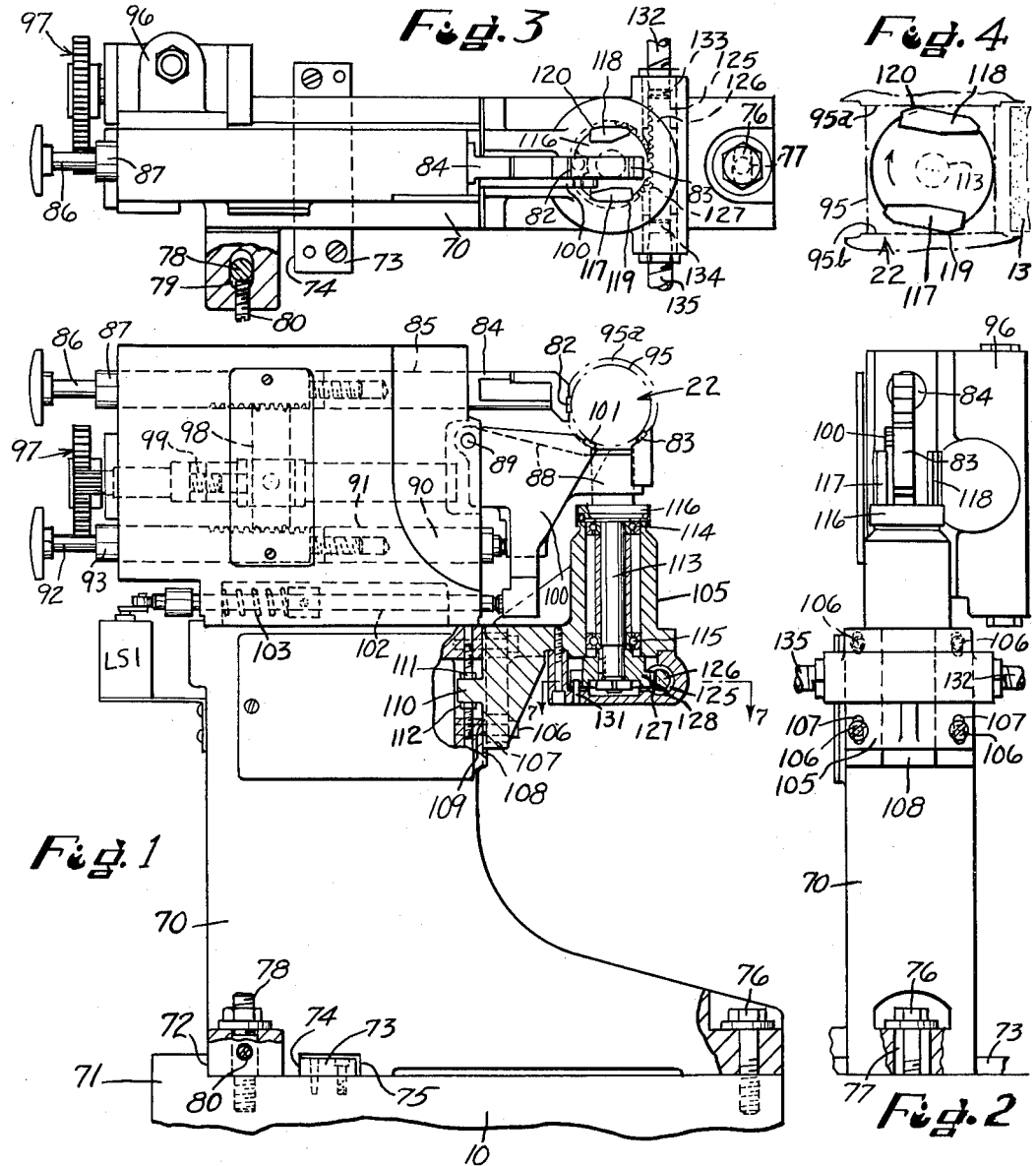
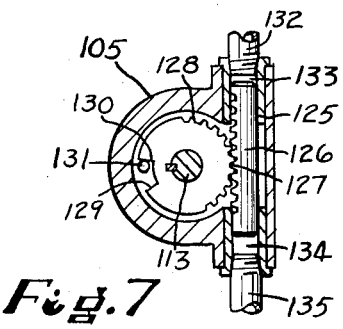
INVENTOR.
CHARLES C. ALVORD
BY
Harold W. Eaton
ATTORNEY INVENTOR.
CHARLES C. ALVORD
BY
Harold W. Eaton
ATTORNEY

United States Patent Office 2,723,504
Patented Nov. 15, 1955

2,723,504

GRINDING MACHINE

Charles C. Alvord, Worcester, Mass., assignor to Norton Company, Worcester, Mass., a corporation of Massachusetts Application August 18, 1954, Serial No. 450,603

6 Claims. (Cl. 51—105)

The invention relates to grinding machines, and more particularly to a work piece locating and positioning mechanism for automatically locating a work piece in an axial direction relative to the grinding wheel.

One object of the invention is to provide a simple and thoroughly practical work positioning mechanism for axially positioning a work piece relative to the work supporting chucks and the grinding wheel. Another object is to provide a work positioning mechanism for positioning a work piece having spaced shouldered portions thereon in an axial direction to facilitate positioning the portion of the work piece to be ground relative to the operative face of the grinding wheel to utilize the side grinding of the grinding wheel on the spaced shouldered portions of the work piece. Another object is to provide a work locating device including a rotatable cam which is arranged to rotate about a relatively fixed axis in which the cam is located in a predetermined position so that when the work piece is loaded into the machine, the cam will be positioned between the spaced shouldered portion of the work piece to be ground. Another object of the invention is to provide a work locating device having a cam rotatable about a relatively fixed axis in which the locating device is arranged to be adjusted laterally to facilitate positioning the axis of rotation of the positioning cam so that it lies in the midplane of the grinding wheel. A further object of the invention is to provide a vertical adjustment for the work locating devices to facilitate positioning the cam for different diameters of work pieces to be ground. Another object is to provide a hydraulically operated mechanism for rotating the cam to impart an axial positioning movement to the work piece relative to its supporting chucks before the work piece is clamped in an operative position.

In the accompanying drawings in which is shown one of various possible embodiments of the mechanical features of the invention;

Fig. 1 is a side elevation of a steadyrest, showing the crankshaft positioning mechanism in cross section;

Fig. 2 is a rear elevation of the steadyrest and crankshaft positioning mechanism;

Fig. 3 is a plan view of the steadyrest and work positioning mechanism as shown in Fig. 1;

Fig. 4 is a fragmentary plan view of the work piece positioning cam, showing it in relationship with the work piece to be ground and the grinding wheel;

Fig. 7 is a sectional view on an enlarged scale, taken approximately on the line 7—7 of Fig. 1.

This invention is particularly applicable to a crankpin grinding machine, such as that shown in the prior U. S. patent to Herbert A. Silven, No. 2,151,666, dated March 21, 1939, to which reference may be had for details of disclosure not contained herein.

Figure 5:
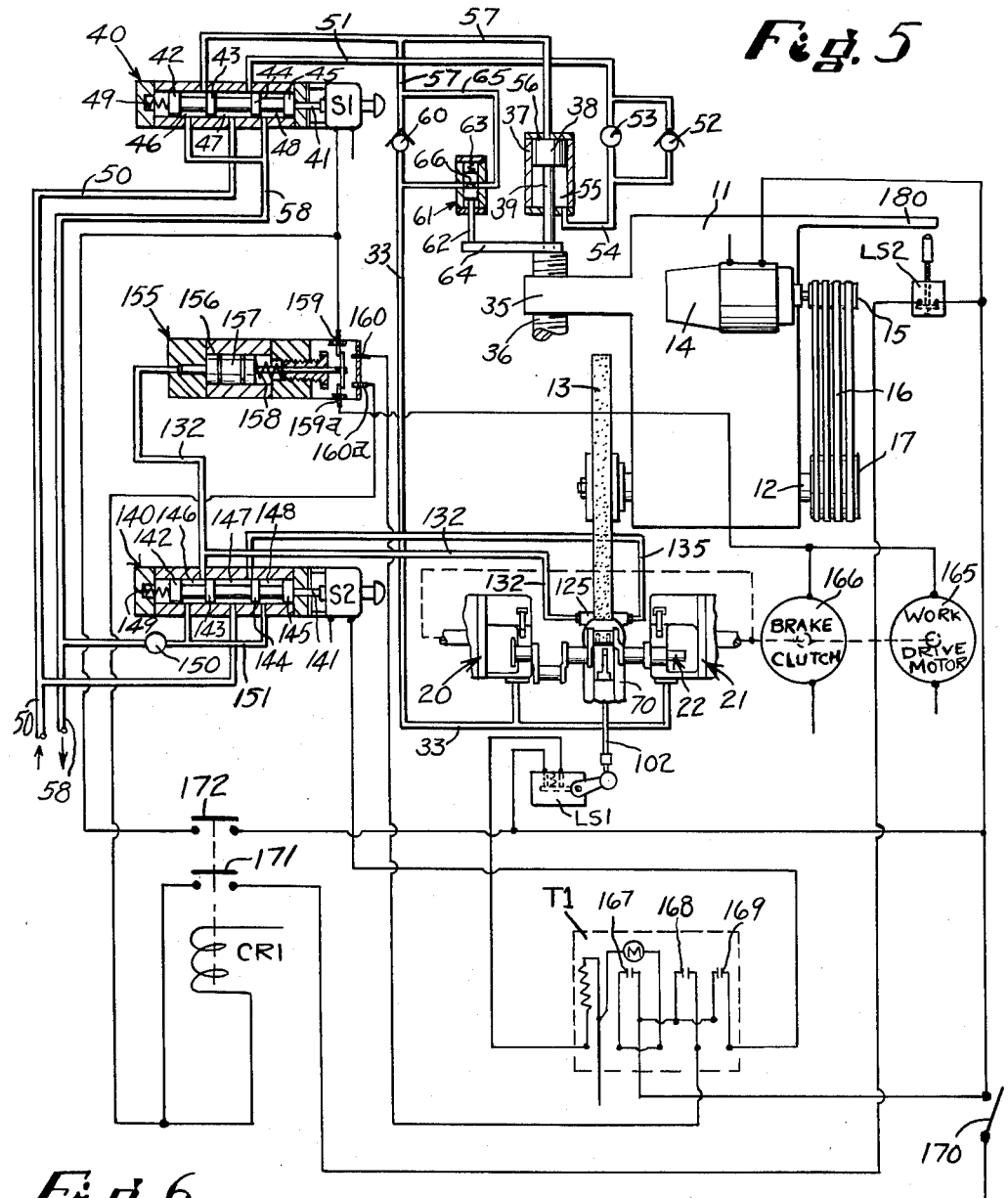
Fig. 5 is a combined hydraulic and electrical diagram of the operating mechanisms of the machine.

As illustrated in the drawings, a machine base 10 serves as a support for a transversely movable wheel slide 11 having a rotatable wheel spindle 12 journalled in suitable bearings (not shown). The wheel spindle 12 supports a grinding wheel 13 on its left hand end (Fig. 5). A suitable driving mechanism is provided for the wheel spindle 12 and grinding wheel 13 comprising an electric motor 14 which is provided with a multiple V-grooved pulley 15 which is connected by multiple V-belts 16 with a pulley 17 mounted on the right hand end of the wheel spindle 12.

Figure 6:
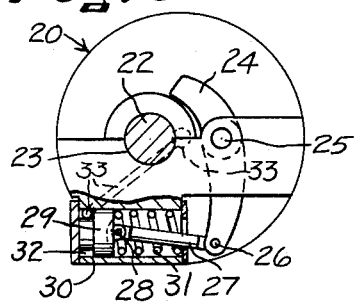
Fig. 6 is an end elevation, partly in section of one of the work supporting pot chucks.

The base 10 also serves as a support for a pair of synchronously rotated axially aligned pot chucks 20 and 21 for supporting and rotating the opposite ends of a crankshaft 22. Each of the pot chucks 20 and 21 are identical in construction consequently only one of these pot chucks has been illustrated in detail. The pot chuck 20 (Fig. 6) is provided with a half bearing 23 for supporting the left hand end of the crankshaft 22. The pot chuck 20 is provided with a pivotally mounted clamping jaw 24 which is supported on a pivot stud 25 carried by the chuck 20. The lower arm of the clamping jaw 24 is connected by a stud 26 with the right hand end of a link 27 (Fig. 6). The other end of the link 27 is connected by a stud 28 with a slidably mounted piston 29 which is slidably mounted within a cylinder 30. The clamping arm 24 is normally held in an unclamped position by means of a compression spring 31. When it is desired to clamp a crankshaft 22 in the pot chuck 20 fluid under pressure is passed into the cylinder chamber 32 to move the piston 29 toward the right so as to swing the clamping jaw 24 in a counter-clockwise direction into clamping engagement with the crankshaft 22 to clamp it rigidly into engagement with the bearing surface 23.

The pot chuck 21 is identical in construction and is arranged so that when fluid under pressure is passed through a pipe 33, it is conveyed simultaneously to the pot chucks 20 and 21 simultaneously to actuate both of the clamping jaws to clamp the opposite ends of the crankshaft 22 in the pot chucks.

A grinding wheel feeding mechanism is provided for imparting a transverse feeding movement to the wheel slide 11. This mechanism may comprise a feed nut 35 depending from the underside of the wheel slide 11. The feed nut 35 meshes with or engages a rotatable feed screw 36 which may be manually rotated in the conventional manner to manually adjust the position of the wheel slide 11. A power operated mechanism is provided for rapidly moving the wheel slide 11 to and from an operative position comprising a hydraulic cylinder 37 which contains a slidably mounted piston 38 connected to one end of a piston rod 39. The other end of the piston rod 39 is operatively connected to the feed screw 36. The cylinder 37, piston 38 and the piston rod 39 are preferably arranged in axial alignment with the feed screw 36.

A control valve 40 is provided for controlling the admission to and exhaust of fluid from both the pot chuck cylinders and the feed cylinder. The valve 40 is a piston type valve comprising a valve stem 41 having spaced valve pistons 42, 43, 44 and 45 formed integrally therewith so as to form valve chambers 46, 47 and 48. The valve 40 is normally held in a right hand end position by a compression spring 49. A solenoid S1 is operatively connected so that when it is energized it serves to shift the valve stem 41 toward the left.

Fluid under pressure is supplied from any suitable source such as for example a fluid pump (not shown) which passes fluid through a pipe 50 into the valve chamber 47. In the position of the valve 40 (Fig. 5) fluid under pressure entering the valve chamber 47 passes through a pipe 51, through a ball check valve 52 and a throttle valve 53, through a pipe 54 into a cylinder chamber 55 to move the valve piston 38 rearwardly into an inoperative position thereby moving the wheel slide 11 together with the grinding wheel 13 also to an inoperative position. During this movement fluid within a cylinder chamber 56 may exhaust through a pipe 57 into the chamber 46 and exhaust through a pipe 58.

Similarly when the solenoid S1 is energized and the valve stem 41 shifts toward the left, fluid under pressure from the pipe 50 entering the valve chamber 47 may pass through the pipe 57 into the cylinder chamber 56 to cause a forward feeding movement of the wheel slide 11 and the grinding wheel 13. During this movement, fluid may exhaust from the cylinder chamber 55 through the pipe 54, through the throttle valve 53, through the pipe 51 into the valve chamber 48 and exhaust through the pipe 58. By manipulation of the throttle valve 53, the rate of the feeding movement of the wheel slide 11 and grinding wheel 13 may be readily controlled.

It is desirable that the hydraulic control system be arranged so that the clamping jaws 24 on the pot chucks 20 and 21 are actuated to clamp a crankshaft 22 therein when the grinding wheel starts its feed movement. Similarly it is desirable that the grinding wheel 13 together with the slide 11 be moved rearwardly so that the grinding wheel is out of contact with the crankshaft being ground before the clamping jaws on the pot chucks are released. This is preferably accomplished by providing a ball check valve 60 between the pipe 57 and the pipe 33. A normally closed by-pass valve 61 is provided to facilitate bypassing fluid through a pipe 65 around the ball check valve 60. The bypass valve 62 is a piston type valve comprising a valve stem 62 and having a compression spring 63 normally to maintain the valve in a closed position so as to prevent passage of fluid through the bypass pipe 65. When the wheel slide 11 is moved rearwardly to an inoperative position, an arm 64 movable therewith engages the valve stem 62 and moves the valve 61 into the position illustrated in Fig. 5 so that fluid may bypass through the pipe 65. In the position of the valve 40 (Fig. 5) fluid under pressure passing through the pipe 51 into the cylinder chamber 55 causes a rearward movement of the wheel slide 11 and grinding wheel 13. During the initial rearward movement of the wheel slide fluid within the pot chuck cylinders cannot exhaust due to the fact that the ball check valve prevents exhaust of fluid therefrom and also due to the fact that the bypass valve 61 is in a closed position. When the wheel slide 11 reaches its rearwardmost position the bypass valve is shifted into the position illustrated so that fluid may exhaust from the pot chuck cylinders through the bypass valve 61 thereby unclamping the ground crankshaft.

When the solenoid S1 is energized to initiate a forward feeding movement of the grinding wheel, fluid under pressure is passed through the valve 40, through the pipe 57 into the cylinder chamber 56 to initiate a forward movement of the piston 38, the wheel slide 11 and the grinding wheel 13. As soon as fluid under pressure is passed through the pipe 57, it is passed momentarily through the bypass pipe 65, through the valve chamber 66 in the bypass valve 61 and through the pipe 33 simultaneously to actuate both of the clamping arms 24 to clamp a crankshaft in the pot chucks 20 and 21. At the same time, fluid under pressure passing through the pipe 57 is also passed through the ball check valve 60 and through the pipe 33 to maintain pressure within the pot chuck cylinders after the bypass valve 61 closes due to forward movement of the wheel slide 11.

The machine is provided with a work steadyrest comprising a seadyrest base 70 which engages a locating surface 72 on an upwardly projecting rib 71 formed integral with the machine base 10. A guide block 73 which is fastened to the machine base 10 is provided with a guide surface 74 to maintain the steadyrest base 70 in operative engagement with the locating surface 72. A clearance groove 75 is formed on the underside of the steadyrest base 70 which provided clearance around the guide block 73. The steadyrest is adjustably mounted on the base 10 by means of a clamping screw 76 which passes through an elongated slot 77 formed in the steadyrest base 70 and is screw threaded nito the machine base 10. The clamping screw 76 serves to clamp the right hand end of the steadyrest base 70 onto the machine base 10. A clamping stud 78 (Fig. 3) passes through an elongated slot 79 formed in the steadyrest base 70 and is screw threaded into the machine base 10. The clamping stud serves to facilitate clamping the left hand end of the steadyrest base 70 in adjusted position on the machine base 10. An adjusting screw 80 is screw threaded through a portion of the steadyrest base 70 and bears against the stud 78 to facilitate locating the steadyrest base in a predetermined position.

As illustrated in the drawings, the steadyrest is a two-bearing shoe type steadyrest having a horizontally adjustable steadyrest shoe 82 and a lower pivotally mounted steadyrest shoe 83. The steadyrest shoe 82 is carried by a horizontally adjustable shoe holder 84 which slides within an aperture 85 formed in the steadyrest base 70. A manually operable adjusting screw 86 rotatably supported by a slidably keyed sleeve 87 within the aperture 85 serves to facilitate a manual adjustment of the steadyrest shoe 82. The lower steadyrest shoe 83 is mounted on a pivotally mounted arm 88 supported by a stud 89 on the steadyrest base 70. The arm 88 is arranged to be actuated by a slide rod 90 slidably supported within a cylindrical aperture 91 formed within the steadyrest base 70. A manually operable adjusting screw 92 which is rotatably supported in a sleeve 93 slidably keyed within the aperture 91 serves to facilitate a manual adjustment of the steadyrest shoe 83.

A power operated mechanism is provided for simultaneously moving the steadyrest shoes 82 and 83 into operative supporting engagement with a crankpin 95 of the crankshaft 22 comprising a fluid motor 96 which is operatively connected to rotate a gear mechanism 97 actuate a nut and screw mechanism 99 so as to impart a transverse movement to a cross arm 98 so as to simultaneously move the steadyrest shoes 82 and 83 into operative supporting engagement with the crankpin being ground. The details of the steadyrest disclosed herein are more fully illustrated and described in my copending application Serial No. 452,656, filed August 27, 1954.

The steadyrest 70 is also provided with a pivotally mounted feeler arm 100 which is pivoted on the stud 89 and is provided with a work engaging shoe 101. The lower end of the feeler arm 100 bears against a slide rod 102 which is normally urged in a direction toward the right by a compression spring 103 which serves normally to exert a pressure tending to rock the feeler arm 100 in a counter-clockwise direction. When a crankshaft is inserted in the machine, the crankpin 95 to be ground engages the shoe 101 and rocks the feeler arm 100 in a clockwise direction which imparts a sliding movement to the rod 102 toward the left to actuate a limit switch LS1.

In a crankpin grinding machine, it is desirable to position the crankpin to be ground in an axial direction relative to the operative face of the grinding wheel to center the crankpin relative to the operative face of the grinding wheel so that when the grinding wheel is fed toward the work to grind the crankpin, equal grinding will be obtained on the opposed shoulders 95a and 95b of the crankpin 95. This positioning is preferably accomplished by axially shifting the crankshaft relative to the spaced pot chucks before the crankshaft is clamped therein. In the preferred construction I provide a positioning mechanism which is precisely located relative to the grinding wheel so that when a crankshaft is loaded into the pot chucks, the positioning cam will be positioned adjacent to the periphery of the crankpin to be ground and will lie between the opposed shoulders 95a and 95b. As illustrated in the drawings, a bracket 105 is adjustably positioned on the steadyrest base 70 by means of a plurality of clamping screws 106 which pass through elongated slots 107 in the bracket 105 and are screw threaded into the steadyrest base 70. The steadyrest base 70 is provided with a vertical plane surface having a shallow wide groove 108 which mates with a correspondingly shaped projecting rib 109 on the bracket 105.

It is desirable to provide a vertical adjustment for the bracket 105 so that the positioning unit may be adjusted to accommodate different diameters of crankpins. The bracket 105 is provided with a projecting lug 110 (Fig. 1). The steadyrest base is provided with a pair of opposed adjusting screws 111 and 112 which are screw threaded into the base and arranged to engage opposite faces of the lug 110. It will be readily apparent from the foregoing disclosure that by loosening of the clamping screws 106 and manipulating the adjusting screws 111 and 112, the bracket 105 may be raised or lowered as desired.

The bracket 105 serves as a support for a vertically arranged shaft 113 which is journalled in a pair of spaced anti-friction bearings 114 and 115. The upper end of the shaft 113 supports a head 116 having a pair of spaced integral upwardly extending lugs 117 and 118 projecting upwardly therefrom. The lugs 117 and 118 are provided with symmetrically shaped cam faces 119 and 120 respectively which are arranged when rotated to engage one or the other of the shoulders 95a or 95b so as to cause an axial movement of the crankshaft 22 relative to the pot chucks 20 and 21 and the grinding wheel 13. The spacing of the lugs 117 and 118 (Fig. 2) serves to provide a clearance space so that the cam head straddles the steadyrest arm 88 and the feeler arm 100. Sufficient clearance is provided so that the cam head may be rotated the required amount for positioning the crankshaft 22.

A fluid pressure actuating mechanism is provided for the cam head 116 comprising a cylinder 125 which contains a slidably mounted piston 126. Rack teeth 127 are formed on the piston 126 which mesh with a gear segment 128 mounted on the lower end of the shaft 113. The gear segment is provided with a notched portion having a pair of spaced stop surfaces 129 and 130 which are arranged in the path of a stop pin 131 fixedly mounted on the frame 105. When the cam head 116 is in an inoperative or loading position, the stop surface 130 (Fig. 7) is moved in a counter-clockwise direction into engagement with the stop pin 131.

When fluid under pressure is passed through a pipe 135 into a cylinder chamber 134, the piston 126 is moved upwardly (Fig. 7) so that the rack 127 meshing with the gear segment 128 rotates the stop surface 130 in a counter-clockwise direction into engagement with the stop pin 131. During this movement fluid within a cylinder chamber 133 may exhaust through a pipe 132. When a crankshaft has been loaded into the machine the upper surface of the lugs 117 and 118 is adjacent to the periphery of the crankpin 95 to be ground. When it is desired to cause an axial positioning of the shaft, fluid under pressure is passed through the pipe 132 into the cylinder chamber 133 to move the piston 126 downwardly (Fig. 7) to cause a clockwise movement of the gear segment 128 so as to rotate the stop surface 129 in a clockwise direction toward the stop pin 131. During the normal operation of the positioning mechanism, the stop surface 129 is spaced from the stop surface 130 so that it does not move into engagement with the pin 131. This movement imparts a clockwise rotary motion to the head 116 so as to rotate the cam faces 119 and 120 into engagement with one or the other of the shoulders 95a and 95b. In case the crankpin 95 is not correctly positioned one of the cam faces 119 or 120 will engage either the shoulder 95b or the shoulder 95a and impart an axial positioning movement to the crankshaft 22. This axial positioning movement of the crankshaft will continue until both of the cam faces 119 and 120 are in engagement with the shoulders 95a and 95b in which position the crankpin 95 is centered relative to the operative face of the grinding wheel 13 and the grinding operation may then proceed.

In the setting up of the crankshaft positioning mechanism, the steadyrest base 70 is adjusted in a plane parallel to the grinding wheel axis until the vertical axis of the shaft 113 lies in the mid-plane of the grinding wheel 13, that is, in a plane passing through the grinding wheel normal to its axis half way between the side faces thereof. After the steadyrest base has been properly positioned, it is clamped by tightening of the clamping screws 76 and 78. The bracket 105 may then be adjusted vertically by loosening of the clamping screws 106 and manipulating an adjusting screw 111 and 112 so as to position the upper faces of the lugs 117 and 118 adjacent to the periphery of the crankpin to be ground.

A control valve 140 is provided for controlling the admission to and exhaust of fluid from the cylinder 125. The control valve 140 is preferably a piston type valve comprising a valve stem 141 having a plurality of spaced valve pistons 142, 143, 144 and 145 formed integrally therewith so as to form a plurality of spaced valve chambers 146, 147 and 148. A compression spring 149 serves normally to hold the valve stem 141 in a left hand end position. A solenoid S2 is provided which when energized serves to shift the control valve stem 141 toward the left (Fig. 5). A throttle valve 150 is provided in an exhaust pipe 151 which serves to control the rate of movement of the piston 126. As illustrated in Fig. 5 fluid under pressure from the pressure line 50 passes through the valve chamber 147, through the pipe 135 to move the piston 126 upwardly (Figs. 3 and 7) to impart a counter-clockwise rotation to the head 116 which movement continues until the stop surface 130 engages the stop pin 131. This movement serves to position the lugs 117 and 118 in an inoperative position as illustrated in Fig. 3. During this movement fluid within the cylinder chamber 133 may exhaust through the pipe 132, through the valve chamber 146, through exhaust pipe 151 and through the throttle valve 150.

When it is desired to impart a positioning movement to the piston 126, the solenoid S2 is energized to shift the valve stem 141 toward the left (Fig. 5) so that fluid under pressure from the pressure pipe 50 may pass through the valve chamber 147, through the pipe 132 into the cylinder chamber 133 to cause a downward movement of the piston 126 (Figs. 3 and 7) thereby imparting a clockwise rotary movement to the head 116 so as to move the cams 119 and 120 into engagement with either the shoulder 95b or the shoulder 95a. This movement continues until both of the cams 119 and 120 are in engagement with the shoulders 95b and 95a respectively thereby axially shifting the crankshaft 22 relative to the pot chucks 20 and 21 so as to position the crankpin 95 in a predetermined position relative to the operative face of the grinding wheel 13.

A pressure switch 155 is connected with the pipe 132. The pressure switch 155 comprises a cylinder 156 having a slidably mounted piston 157. The piston 157 is normally held in a left hand end position by means of a compression spring 158 to maintain a pair of electric contacts 159—159a closed. When fluid under pressure is passed through the pipe 132 to the crankshaft positioning cylinder 125, it also passes into an end chamber at the left hand end of the pressure switch 155. The compression of the spring 158 is adjusted so that the piston 126 moves to position the crankshaft before the piston 157 moves toward the right to break the contacts 159—159a and to close a pair of contacts 160—160a.

A driving mechanism is provided for synchronously rotating the pot chucks 20 and 21 comprising an electric motor 165 which is connected through an electric brake-clutch unit to control the synchronous rotation of the pot chucks 20 and 21.

When it is desired to operate this machine, a main switch 170 is closed which closes a circuit to start the wheel drive motor 14 to impart a rotary motion to the grinding wheel 13. A crankshaft 22 is loaded into supporting engagement with the pot chucks 20 and 21. The crankpin to be ground engages the contact member 101 of the feeler arm 100 and closes a normally open limit switch LS1 which serves to energize an electric timer T1. The timer T1 may be of any of the standard commercial varieties such as for example the Micro-Flex instantaneous reset timer which is manufactured by the Signal Electric Company of Moline, Ill. The energizing of the timer T1 closes the holding contacts 167 of the timer T1 and also closes the contacts 168 and 169. The closing of the contacts 169 serves to energize the solenoid S2 to shift the valve stem 141 toward the left so as to pass fluid under pressure through the pipe 132 to cause a rotary motion to be imparted to the crank positioning mechanism to axially position the crankpin to be ground in a manner above described. At the same time fluid under pressure is passed through the pipe 132 it enters a chamber at the left hand end of the pressure switch 155 so that after the crank positioning mechanism has operated, the piston 157 will shift toward the right to make the contacts 160—160a which serve to energize a relay switch CR1 and to set up a holding circuit to hold the relay CR1 energized through a contactor 171. After a predetermined time interval has elapsed, and the timer times-out the contacts 167, 168 and 169 of the timer open. The opening of the contacts 169 of the timer T1 deenergize the solenoid S2 so that the valve 140 returns to the position illustrated and the pressure switch 155 returns to the position illustrated in Fig. 5. While the contacts 160—160a are closed, a circuit is completed to energize the relay switch CR1 and a limit switch LS2 sets up a holding circuit through the contactor 171.

The closing of the contactor 172 of the relay switch CR1 serves to energize the solenoid S1 to shift the valve stem 41 toward the left so that fluid under pressure is passed through the pipe 57, through the bypass pipe 65, through the valve chamber 66 and through the pipe 33 and also passes through the ball check valve 60 to actuate the clamping jaws 24 of the pot chucks 20 and 21 to locate the positioned crankshaft 22 in position for a grinding operation. At the same time fluid under pressure passing through the pipe 57 enters the cylinder chamber 56 to cause a forward feeding movement of the grinding wheel. At the same time the solenoid S1 is energized to start an infeeding movement of the grinding wheel, a circuit is completed through the normally closed contacts 159—159a of the pressure switch 155 to energize the motor brake-clutch to impart a synchronous rotation to the pot chucks 20 and 21.

As the wheel slide moves forward, the bypass valve 161 is closed by released compression of the spring 63. When the grinding wheel approaches its forward position in grinding the crankpin 95 to the predetermined size, an arm 180 carried by the wheel slide 11 opens a normally closed limit switch LS2 which breaks the holding circuit so as to deenergize the relay switch CR1. Deenergizing relay switch CR1 opens the contactor 172 breaking a circuit thereby deenergizing solenoid S1 to cause a rearward movement of the grinding wheel slide 11 and the grinding wheel 13. During this movement the pressure is maintained upon the pot chuck clamps until the wheel slide 11 reaches its rearward position to open the bypass valve 61 thereby allowing fluid to exhaust from the pot chuck cylinders to unclamp the crankshaft supported therein. The crankshaft may then be removed from the pot chucks at which time the released compression of the spring 103 serves to open the limit switch LS1 to automatically reset the timer T1 for the next grinding operation. When the solenoid S1 which deenergizes to cause a rearward movement of the grinding wheel, a circuit through contactor 159—159a to the motor brake-clutch is opened to disengage the clutch and apply the brake thereby stopping rotation of the pot chucks 20 and 21.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a transversely movable rotatable grinding wheel thereon, a rotatable work support on said base including a pair of spaced aligned rotatable pot chucks to support the opposite ends of a work piece to be ground, and a work positioning mechanism for axially positioning the grinding wheel and work piece having spaced shouldered portions thereon comprising an adjustably mounted frame, a rotatable cam, a vertically arranged rotatable shaft on said frame to support said cam, means to adjust said frame in one direction to position the axis of said shaft in the mid-plane of the said wheel normal to the wheel axis, means to adjust said frame in another direction to position said cam between the shoulders on the work piece when it is located into said pot chucks, and means including a fluid motor operatively connected to rotate said cam into engagement with said shoulders axially to position the work piece relative to the grinding wheel.

2. In a grinding machine having a base, a transversely movable rotatable grinding wheel thereon, a rotatable work support on said base including a pair of spaced aligned rotatable pot chucks to support the opposite ends of a work piece to be ground, and a work positioning mechanism for axially positioning the grinding wheel and work piece having spaced shouldered portions thereon comprising an adjustably mounted frame, a rotatable cam, a vertically arranged rotatable shaft on said frame to support said cam, means to adjust the position of said shaft in a direction normal to its axis so as to locate the axis in the mid-plane of said grinding wheel, means axially to adjust the position of said shaft to facilitate positioning said cam so that it is positioned between the shoulders on the work piece when loaded into the machine, and means including a fluid motor operatively connected to rotate said cam into engagement with said shoulders axially to position the work piece relative to the grinding wheel.

3. In a grinding machine having a base, a transversely movable rotatable grinding wheel thereon, a rotatable work support on said base including a pair of spaced axially aligned rotatable pot chucks to support the opposite ends of a work piece to be ground, and a work positioning mechanism for axially positioning the grinding wheel and the work piece having spaced shouldered portions comprising an adjustably mounted frame, a vertically arranged rotatable shaft on said frame, a cam on said shaft, means to adjust said frame transversely so as to position the axis of said shaft in the mid-plane of the grinding wheel so that the cam is positioned between the shoulders on the work piece when it is loaded into said pot chucks, and means including a fluid motor on said frame operatively connected to rotate said shaft and cam into engagement with said shoulders axially to position a work piece relative to the grinding wheel.

4. In a grinding machine as claimed in claim 3, in combination with the parts and features therein specified of means to adjust said frame vertically to position said shaft and cam in an axial direction normal to the axis of the work piece to be ground to facilitate positioning work pieces of different diameters.

5. In a grinding machine having a base, a transversely movable rotatable grinding wheel thereon, a rotatable work support on said base including a pair of spaced axially aligned rotatable pot chucks to support the opposite ends of a work piece to be ground, and a work positioning mechanism for axially positioning the grinding wheel and the work piece having a spaced shouldered portion comprising an adjustably mounted frame, a vertically arranged rotatable shaft on said frame, a cam on said shaft, means to adjust said frame transversely in a horizontal direction to position the axis of said shaft in the mid-plane of the grinding wheel so that the cam is positioned between the shoulders on the work piece when it is loaded into said pot chucks, means to adjust said frame vertically to position said cam relative to the axis of the work piece, and means including a fluid motor on said frame operatively connected to rotate said cam into engagement with said shoulders axially to position a work piece relative to the grinding wheel.

6. In a grinding machine having a base, a transversely movable rotatable grinding wheel thereon, a rotatable work support on said base including a pair of spaced axially aligned rotatable pot chucks to support the opposite ends of a work piece to be ground, a work steadying rest adjustably mounted on said base, and a work positioning mechanism for axially positioning the grinding wheel and work piece having spaced shouldered portions thereon comprising a frame adjustably clamped on said steadyrest, a vertically arranged rotatable shaft on said frame, a cam on said shaft which is positioned between spaced shoulders on a work piece when it is loaded into said pot chucks, means to adjust said steadyrest laterally to facilitate positioning the axis of said shaft in the mid-plane of the grinding wheel, means to adjust said frame vertically relative to said steadyrest to position said cam relative to the work axis, and means including a fluid motor on said frame operatively connected to rotate said shaft and said cam into engagement with said shoulders axially to position the work piece relative to the grinding wheel.

References Cited in the file of this patent
UNITED STATES PATENTS

| | | |
|---|---|---|
| 1,189,557 | Gardner | July 4, 1916 |
| 2,632,196 | Rappl | Mar. 24, 1953 |
| 2,693,062 | Silven | Nov. 2, 1954 |